US009868668B2

United States Patent
Lecomte et al.

(10) Patent No.: US 9,868,668 B2
(45) Date of Patent: Jan. 16, 2018

(54) FAST WETTING AGENT FOR DRY-MIX APPLICATIONS

(71) Applicants: DOW CORNING CORPORATION, Midland, MI (US); Jean-Paul H. Lecomte, Brussels (BE); Nicolas Ziolkowski, Nivelles (BE)

(72) Inventors: Jean-Paul H. Lecomte, Brussels (BE); Nicolas Ziolkowski, Nivelles (BE)

(73) Assignee: Dow Corning Corporation, Midland, MI (US)

( * ) Notice: Subject to any disclaimer, the term of this patent is extended or adjusted under 35 U.S.C. 154(b) by 427 days.

(21) Appl. No.: 14/430,633

(22) PCT Filed: Oct. 31, 2013

(86) PCT No.: PCT/EP2013/072770
§ 371 (c)(1),
(2) Date: Mar. 24, 2015

(87) PCT Pub. No.: WO2014/068031
PCT Pub. Date: May 8, 2014

(65) Prior Publication Data
US 2015/0259249 A1 Sep. 17, 2015

(30) Foreign Application Priority Data
Nov. 1, 2012 (GB) .................................. 1219677.0

(51) Int. Cl.
| | |
|---|---|
| *C04B 24/42* | (2006.01) |
| *C04B 28/02* | (2006.01) |
| *C04B 40/00* | (2006.01) |
| *C04B 20/10* | (2006.01) |
| *B01F 17/54* | (2006.01) |
| *C04B 111/27* | (2006.01) |

(52) U.S. Cl.
CPC .......... *C04B 24/42* (2013.01); *B01F 17/0071* (2013.01); *C04B 20/1051* (2013.01); *C04B 28/02* (2013.01); *C04B 40/0042* (2013.01); *C04B 2111/27* (2013.01); *Y02W 30/92* (2015.05)

(58) Field of Classification Search
CPC .......... C04B 40/0608; C04B 40/0042; C04B 18/064; C04B 28/02; C04B 24/085; C04B 24/42; C04B 24/2623; C04B 24/383; C04B 20/1025; C04B 20/1051; C04B 20/1048; C04B 20/1033; C04B 14/06; C04B 14/28; C04B 14/047; C04B 14/365; C04B 14/041; C04B 16/08; C04B 16/082; C04B 2111/27; B01F 17/0071
See application file for complete search history.

(56) References Cited

U.S. PATENT DOCUMENTS

| | | | |
|---|---|---|---|
| 3,933,672 A | 1/1976 | Bartolotta et al. | |
| 4,806,266 A | 2/1989 | Burrill | |
| 5,238,596 A | 8/1993 | Smith | |
| 5,766,323 A | 6/1998 | Butler et al. | |
| 7,399,350 B2 * | 7/2008 | Rajaraman | C09D 7/06 106/31.26 |
| 7,507,775 B2 * | 3/2009 | Leatherman | A61K 8/891 524/379 |
| 7,645,720 B2 * | 1/2010 | Leatherman | A61K 8/585 504/116.1 |
| 7,935,842 B2 | 5/2011 | Policello et al. | |
| 8,445,560 B2 | 5/2013 | Lecomte et al. | |
| 8,703,874 B2 | 4/2014 | Aberle et al. | |
| 2006/0254468 A1 * | 11/2006 | Bastelberger | C04B 24/085 106/802 |
| 2011/0196070 A1 | 8/2011 | Keller et al. | |
| 2011/0203487 A1 * | 8/2011 | Aberle | C04B 20/1051 106/781 |
| 2015/0265990 A1 * | 9/2015 | Chao | C04B 24/42 504/358 |

* cited by examiner

*Primary Examiner* — Anthony J Green
(74) *Attorney, Agent, or Firm* — Timothy J. Troy

(57) ABSTRACT

A particulate wetting and hydrophobing additive comprising components a) and b), where: component a) is a disiloxane having structure (I) Where $R^2$ is selected from a branched or linear hydrocarbon group of 2 to 10 carbons, a substituted branched or substituted linear hydrocarbon group of 2 to 10 carbons, an aryl group, a substituted aryl group and an optionally substituted alkyl hydrocarbon group of 4 to 9 carbons containing aryl substituents of 6 to 20 carbons; $R^1$, $R^3$, $R^4$ and $R^5$ are each independently selected from the monovalent hydrocarbon groups of 1 to 4 carbons, substituted monovalent hydrocarbon groups of 1 to 4 carbon atoms, aryl, and a hydrocarbon group of 6 to 20 carbons containing an aryl group; Z is a linear or branched divalent hydrocarbon radical of 1 to 10 carbon atoms and $R^8$ is selected from OH, H, monovalent hydrocarbon groups of 1 to 6 carbons and acetyl, each of the subscripts a, b and c are zero or positive provided that $a+b+c \geq 1$; and component b) is a carrier.

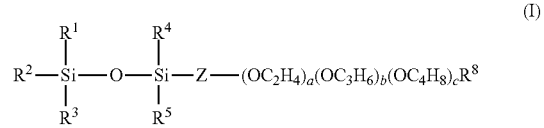

(I)

$$R^2-\underset{\underset{R^3}{|}}{\overset{\overset{R^1}{|}}{Si}}-O-\underset{\underset{R^5}{|}}{\overset{\overset{R^4}{|}}{Si}}-Z-(OC_2H_4)_a(OC_3H_6)_b(OC_4H_8)_cR^8$$

15 Claims, No Drawings

FAST WETTING AGENT FOR DRY-MIX APPLICATIONS

This application is a national stage entry of International Patent Application No. PCT/EP2013/072770, filed Oct. 31, 2013, which claims priority to and all the advantages of Great Britain Patent Application No. 1219677.0, filed Nov. 1, 2012, the contents of each of which are incorporated herein by reference in their entirety.

This disclosure relates to a particulate wetting and hydrophobing agent containing silicon based surfactants for use in building material protection products as additive in surface post-treatment formulations, admixtures and dry-mix products and products containing said silicon-based surfactants".

Building materials such as cements and mortars may contain a large number of additives are added to modify their properties. These may be added to dry mixed products, wet mixed materials (i.e. after the addition of water) or in hardened state after application. Such additives may include, for example, superplasticizers, accelerating additives, retarders, extenders, weighting agents, dispersants, strengthening agents, antifoams, anti-shrinkage agents, rheology modifiers, and surfactants.

In the case of building materials e.g. cements and mortars there has been a propensity to introduce a wide variety of additives to render the finished product hydrophobic after application and drying. This is because water is the most common cause of serious damage in concrete and rendering and the like. Water is responsible for the ingress of substances having detrimental effects on said concrete etc e.g. salts. Water is also involved in the promotion of the growth of micro-organisms and frost damage in cold periods. Also, heat transition is directly linked to the amount of moisture in building materials.

A wide variety of materials may be utilised to make building materials such as mortars and concrete and the like hydrophobic. These include oleochemical raw materials, namely metal soaps and silicon-based materials. Whilst the addition of such materials are merited because of a beneficial cost/hydrophobic performance ratio (a dosage of 0.3% is sufficient to attain the required level of hydrophobicity), the presence of such materials can have detrimental effects. Their hydrophobic nature results in poor wettability of the dry-mortar when water is added to the dry-mix because they are strongly hydrophobic and as such insoluble in water which renders them difficult to incorporate in the mortar paste. In practice that means that often the water repellent agents are not fully effective or the batches are not mixed homogenously. Water, soluble soaps such as sodium stearate and sodium oleate have been used as an alternative but whilst their water solubility is an advantage they also have drawbacks in that they cause a greater level of efflorescence (due to the presence of sodium salts), a greater water uptake (i.e. reduced hydrophobicity) and a lower shelf-life than alkali earth and transition metal soaps."

To counterbalance the hydrophobic nature of such materials and their effects on mortar paste properties such as slump or handling properties, more hydrophilic molecules such as surfactants can be added. Surfactants do not only induce a positive impact on properties of fresh concrete but also on a long term basis when concrete has hardened by reducing for example shrinkage through decrease of tap water surface tension."

Furthermore, the pH nature of dry-mixes, e.g. concrete and mortars, after hydration (addition of water) dramatically restricts the choice of suitable surfactants. For example, whilst the wetting properties of trisiloxane based materials is well known to the industry, it is also appreciated that, as discussed in column 1 of U.S. Pat. No. 7,935,842, "the trisiloxane compounds may only be used in a narrow pH range, ranging from a slightly acidic pH of 6 to a very mildly basic pH of 7.5. Outside this narrow pH range the trisiloxane compounds are not stable to hydrolysis and undergo a rapid decomposition".

EP 0811584 describes a cementitious material in powder form comprising cement, also comprises sufficient of a particulate wetting and hydrophobing additive, which comprises from 5 to 15 parts by weight of an organopolysiloxane component, from 10 to 40 parts by weight of a water-soluble or water-dispersible binder and from 50 to 80 parts by weight of a carrier particle, to give from 0.01 to 5% by weight of the organosiloxane component based on the weight of the cement.

There is a need for a granulated/powdered wetting agent that will impart a good wettability to dry-mixes of building materials containing hydrophobic additives without impacting hydrophobic properties of such additives and characteristics of wet mixes of the building materials while improving performance of hydrophobic materials in the hardened state (i.e. after drying in situ).

Accordingly there is provided herein A particulate wetting and hydrophobing additive comprising components a) and b), where:
component a) is a disiloxane having structure

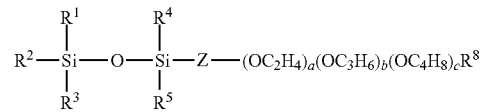

Where $R^2$ is selected from a branched or linear hydrocarbon group of 2 to 10 carbons, a substituted branched or substituted linear hydrocarbon group of 2 to 10 carbons, an aryl group, a substituted aryl group and an optionally substituted alkyl hydrocarbon group of 4 to 9 carbons containing aryl substituents of 6 to 20 carbons; $R^1$, $R^3$, $R^4$ and $R^5$ are each independently selected from the monovalent hydrocarbon groups of 1 to 4 carbons, substituted monovalent hydrocarbon groups of 1 to 4 carbons, aryl, and a hydrocarbon group of 6 to 20 carbons containing an aryl group;
Z is a linear or branched divalent hydrocarbon radical of 1 to 10 carbons and $R^8$ is selected from OH, H, monovalent hydrocarbon groups of 1 to 6 carbons and acetyl, each of the subscripts a, b and c are zero or positive provided that a+b+c≥1; and
component b) is a carrier.

Alternatively a particulate wetting and hydrophobing additive comprising the following components: —
a disiloxane having the following structure

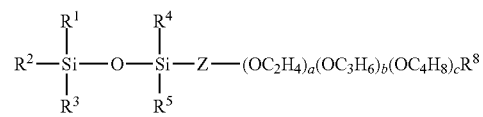

Where $R^2$ is selected from a branched or linear hydrocarbon group consisting of 2 to 10 carbons, substituted branched or substituted linear hydrocarbon group consisting of 2 to 10 carbons, an aryl group, a substituted aryl group and an optionally substituted alkyl hydrocarbon group of 4 to 9 carbons containing aryl substituents of 6 to 20 carbon atoms; $R^1$, $R^3$, $R^4$ and $R^5$ are each independently selected from the group consisting of monovalent hydrocarbon radicals having 1 to 4 carbon atoms, substituted monovalent hydrocarbon radicals having 1 to 4 carbon atoms, aryl, and a hydrocarbon group of 6 to 20 carbon atoms containing an aryl group; Z is a linear or branched divalent hydrocarbon radical of from 1 to 10 (inclusive) carbon atoms and $R^8$ is selected from the group consisting of OH, H, monovalent hydrocarbon radicals of from 1 to 6 carbon atoms and acetyl, each of the subscripts a, b and c are zero or positive provided that a+b+c≥1; and a carrier.

It is to be understood that the concept "comprising" where used herein is used in its widest sense to mean and to encompass the notions of "include", "comprehend" and "consist of". For the purpose of this application "Substituted" means one or more hydrogen atoms in a hydrocarbon group has been replaced with another substituent. Examples of such substituents include, but are not limited to, halogen atoms such as chlorine, fluorine, bromine, and iodine; halogen atom containing groups such as chloromethyl, perfluorobutyl, trifluoroethyl, and nonafluorohexyl; oxygen atoms; oxygen atom containing groups such as (meth)acrylic and carboxyl; nitrogen atoms; nitrogen atom containing groups such as amino-functional groups, amido-functional groups, and cyano-functional groups; sulphur atoms; and sulphur atom containing groups such as mercapto groups.

It is to be understood that the term particulate wetting and hydrophobing additive is intended to mean any suitable particulate form but in particular a powder wetting and hydrophobing additive or a granular wetting and hydrophobing additive and furthermore for the avoidance of doubt the additive functions to both wet and hydrophobe materials but such functions are not necessarily simultaneous. Typically they will act initially as wetting agents and subsequently and/or simultaneously hydrophobing agents.

The disiloxane as hereinbefore described is a disiloxane as hereinbefore depicted wherein $R^1$, $R^3$, $R^4$ and $R^5$ are each independently selected from the group consisting of monovalent hydrocarbon radicals having 1 to 4 carbon atoms, aryl, and a hydrocarbon group of 6 to 20 carbon atoms containing an aryl group;

$R^2$ is selected from a branched or linear hydrocarbon group consisting of 2 to 10 carbons, an optionally substituted aryl group, and an alkyl hydrocarbon chain of 4 to 9 carbons having one or more aryl substituents of 6 to 20 carbon atoms or a branched or linear hydrocarbon group consisting of 1 to 6 carbons when $R^1$ and $R^3$ are independently an aryl group, or a hydrocarbon group of 6 to 20 carbon atoms containing an aryl group; Z is a linear or branched divalent hydrocarbon radical of from 2 to 10 (inclusive) carbon atoms and $R^8$ is selected from the group consisting of OH, H, monovalent hydrocarbon radicals of from 1 to 6 carbon atoms and acetyl and each of the subscripts a, b and c are zero or positive provided that a+b+c≥1.

In one embodiment Z is a linear or branched divalent hydrocarbon radical of from 2 to 6 (inclusive) carbon atoms and furthermore, $R^8$ is selected from the group consisting of OH, H, monovalent hydrocarbon radicals of from 1 to 6 carbon atoms and acetyl, but is most preferably OH, and subscripts a≥0, b≥0 and c=0 provided that a+b≥1.

In a further alternative Z is a linear or branched divalent hydrocarbon radical of from 2 to 6 (inclusive) carbon atoms and $R^8$ is selected from the group consisting of OH, H, monovalent hydrocarbon radicals of from 1 to 6 carbon atoms and acetyl but is most preferably OH, subscript a>1, subscript b≥0 and subscript c=0. Alternatively, a is ≥3 and b and c are both zero. In a further alternative a and b are both ≥3 with a≥b and c is zero.

In one embodiment $R^1$ and/or $R^3$ is/are selected from the group consisting of monovalent hydrocarbon radicals having 1 to 4 carbon atoms which may contain substitution by having e.g. one or more C—F bonds, an optionally substituted aryl group, and a hydrocarbon group of 4 to 9 carbons containing an aryl group and $R^4$ and $R^5$ are each independently selected from the group consisting of monovalent hydrocarbon radicals having 1 to 4 carbon atoms which may contain substitution by having e.g. one or more C—F bonds, typically methyl or ethyl groups. Alternatively $R^1$ and/or $R^3$ is/are optionally substituted aryl groups and $R^4$ and $R^5$ are each independently selected from the group consisting of monovalent hydrocarbon radicals having 1 to 4 carbon atoms which may contain substitution by having e.g. one or more C—F bonds, typically methyl or ethyl groups.

In one alternative $R^2$ is selected from a linear or branched hydrocarbon group consisting of 7 to 102 carbons or an optionally substituted aryl group.

Specifically preferred disiloxanes include disiloxanes of the following compositions:

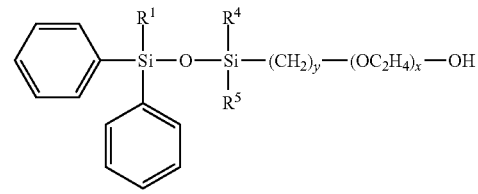

Formula 1a

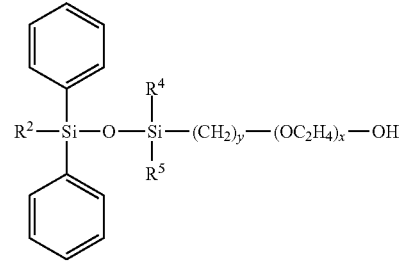

Formula 1b wherein in each case of Formula 1a and 1 b respectively $R^1$, $R^4$ and $R^5$ as hereinbefore described, y is an integer of from 2 to 7, alternatively y is an integer of from 2 to 5 and x is an integer of from 5 to 10, alternatively x is 6, 7 or 8. Both or either aryl group may be optionally substituted; in formula 1 b, of course, $R^2$ is a branched or linear hydrocarbon group consisting of 1 to 6 carbons For example Formula 2a

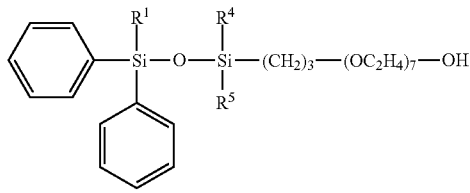

Formula 2b

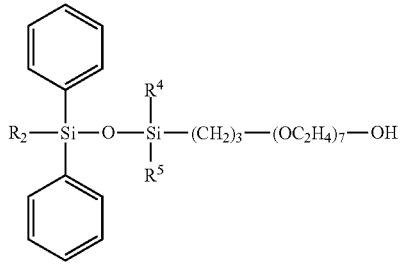

Where $R^1$, $R^4$ and $R^5$ are each independently selected from methyl, ethyl, propyl or isopropyl groups.

Formula 3

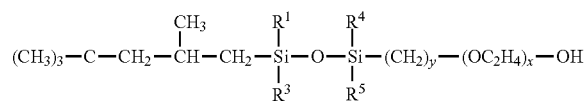

Where $R^1$, $R^3$, $R^4$, $R^5$, x and y are as hereinbefore described such as the following:

Formula 4

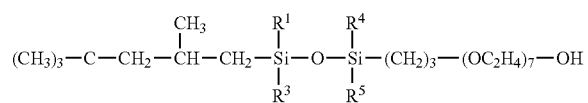

Where $R^1$, $R^3$, $R^4$ and $R^5$ are each independently selected from methyl, ethyl, propyl or isopropyl groups;

Formula 5

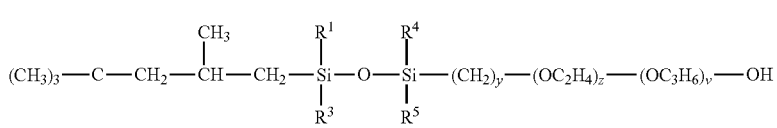

Where y, $R^1$, $R^3$, $R^4$ and $R^5$ as hereinbefore described, z is an integer of from 5 to 15, alternatively z is an integer of from 8 to 12 and v is an integer of from 2 to 10, alternatively v is an integer of from 2 to 6. For example Formula 6

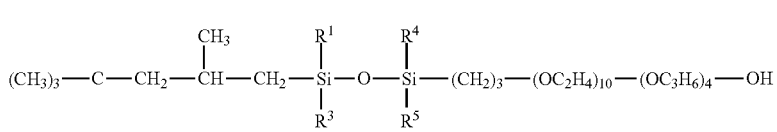

Where $R^1$, $R^3$, $R^4$ and $R^5$ are each independently selected from methyl, ethyl, propyl or isopropyl groups.

Formula 7

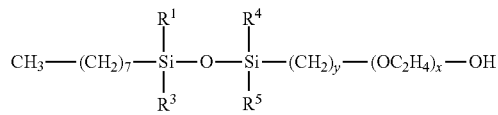

Where $R^1$, $R^3$, $R^4$ and $R^5$ as hereinbefore described, y is an integer of from 2 to 7, alternatively y is an integer of from 2 to 5 and x is an integer of from 5 to 10, alternatively x is 6, 7 or 8. For example Formula 8

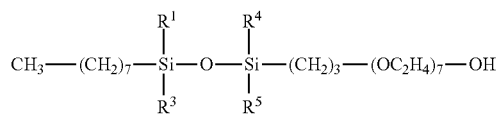

Where $R^1$, $R^3$, $R^4$ and $R^5$ are each independently selected from methyl, ethyl, propyl or isopropyl groups.

The disiloxanes described herein may be used as surfactants and/or as wetting materials in compositions but they breakdown in a high pH environment through a hydrolysis reaction. The hydrophobing agents released when the above are hydrolysed are, for sake of example:

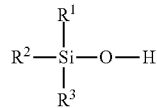

Hence in the case of formula 1a and 2a the hydrophobing molecule after hydrolysis is:

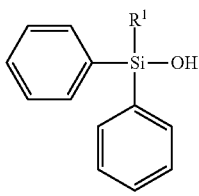

in the case of formula 1b and 2b the hydrophobing molecule after hydrolysis is

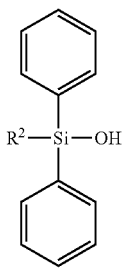

in the case of formulas 3, 4, 5 and 6 the hydrophobing molecule after hydrolysis is:

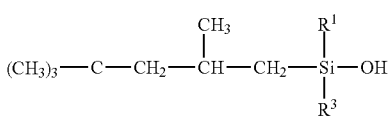

in the case of formula 7 and 8 the hydrophobing molecule after hydrolysis is

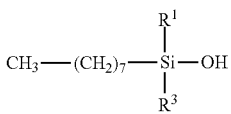

In each case $R^1$ and $R^3$ are as hereinbefore described.

Carrier particles are the other essential ingredients as hereinbefore described. The carrier particles comprise one or more suitable water-soluble, water-insoluble or water-dispersible particles. Preferred carrier particles include gypsum, calcium sulphate formed in flue gas desulphurisation, magnesium sulphate or barium sulphate starch, native starch, methyl cellulose, carboxy methyl cellulose, sand, silica, alumino silicates, clay materials, zeolites, calcium carbonates, polystyrene beads and polyacrylate beads or a mixture thereof. Most preferred carrier particles are gypsum and/or zeolites.

The carrier particles may have a diameter of from 1 to 100 µm, most preferably 1 to 50 µm. Although on the one hand it is preferred to use materials, which fulfil a useful role in, for example, gypsum based compositions; it has been found that water-soluble carrier particles have particularly interesting effects, even if they are not per se active materials in such compositions. Furthermore, it is preferred that the granules preferably have a maximum diameter of 1.4 mm.

In the case when the particulate wetting and hydrophobing additive is in the form of a powder, typically the only 2 ingredients present will be said disiloxane and said carrier and the disiloxane will have been absorbed onto or into the carrier. Any suitable process may be undertaken to have the disiloxane adsorbed into the carrier, e.g. spray drying spray cooling, twin-screw extrusion, prilling, micro-encapsulation, high-shear granulation, fluidized granulation. The disiloxane is present in an amount from 1% to 50%, alternatively 1 to 40% by weight of the total composition and unless additional optional additives are present the remainder of the weight is taken up by the carrier and the total amount present is 100% by weight of the composition, i.e. given the above in a 2 component composition carrier is present in an amount of from 50 to 99% by weight of the composition, or alternatively 60 to 99% by weight of the composition.

In the case when the particulate wetting and hydrophobing additive is in the form of a granular material the additive must be prepared via a suitable granulation method for example those described in EP 0811584 and EP 496510 as will be discussed below.

When the particulate wetting and hydrophobing additive is in the form of a granular material one or more additional ingredients may be required. For example, the granular material may also contain a binder to bind the carrier and disiloxane into granules. Any suitable binder may be utilised but, when present a water-soluble or water-dispersible binder material is preferred. They may, for example be materials which at room temperature, i.e. from 20 to 25° C., have a waxy, highly viscous or solid consistency and have a melting point of from 25 to 150° C. Examples of suitable water-soluble or water-dispersible binder materials include polyvinyl alcohol, methyl cellulose, carboxy methyl cellulose, ethoxylated fatty alcohols and mixtures thereof with fatty acids and fatty acid esters and other film forming polymers. It is preferred that the binder material is actually water soluble. Preferred binders are polyvinyl alcohols and/or ethoxylated fatty alcohol based waxes or ethoxylated fatty alcohol wax/$C_{16-20}$ fatty acid mixtures.

The particulate wetting and hydrophobing additive preferably comprises, when in granular form, based on a total weight of 100%, comprises 5 to 80% by weight of carrier based on the total % weight of 100%, from 3 to 45% by weight of binder and from 5 to 90% disiloxane, alternatively 5 to 80% by weight of disiloxane with the understanding that when a 3 component composition the total composition is 100% (i.e. if the granules are made solely from the 3 components above if the weight % of carrier is 80% the total weight % of binder+disiloxane is 20% of the total weight of the composition). It is also preferred that the disiloxane and binder together comprise from 25 to 45% by weight of the total weight of the carrier. It is also preferred that the weight ratio of carrier to the combined weight of binder and disiloxane is in the range from 3/2 to 4/1, and that the weight ratio of binder to disiloxane component is a maximum of 2/1 but is preferably about 3/2.

The wetting and hydrophobing additive is preferably granulated, which means that it has been prepared by a granulation process. In a granulation process disiloxane and the water-soluble or water-dispersible binder are deposited in their liquid form onto carrier thus forming a free flowing solid powder. Granulation methods have been described in a number of patent specifications including EP 0811584. Any of the granulation processes described in EP 0811584 may be utilised to prepare a hydrophobing additive in accordance with the present invention.

The granulating process by which the hydrophobing additives are produced comprises the steps of where necessary heating disiloxane and/or binder to give a liquid material, either separately or in admixture, e.g. as a flowable slurry, which is then deposited onto carrier and when present carrier, e.g. in a fluidised bed, thus causing disiloxane and binder in admixture to solidify, e.g. through cooling or through the evaporation of a solvent, onto the carrier particles and form a free flowing powder. Methods of granulating such additives have been described in a number of publications, e.g. GB 1407997, EP 0210721 and EP 0496510.

The granulation process ensures that disiloxane and binder are contacted in their liquid phase and a mixture of disiloxane and binder are deposited onto the carrier. It is possible to prepare a mixture of binder and disiloxane components beforehand, e.g. by mere mixing of the materials or by causing them to be admixed in the presence of adjuvants such as stabilising agents or solvents. Conventional procedures for making powders are particularly convenient e.g. granulation and fluid bed coating procedures, both being comprised in the definition of granulation as used herein. For example binder in liquid form (e.g. achieved through heating of the material where necessary), and the organopolysiloxane in liquid form (where needed by admixture with small amounts of solvent), may be passed into a tower and permitted to form the hydrophobing additive by depositing the carrier particles, e.g. native starch onto a mixture of disiloxane and binder.

In a further method disiloxane and binder are sprayed simultaneously onto a fluidised bed. Upon spraying small liquid droplets are formed containing disiloxane and binder. The droplets are usually heated, as binder is to be in liquid form. The droplets then cool down as they make their way onto the bed. Thus they solidify, forming a particulate finely divided hydrophobing additive which is then deposited onto the carrier particle. Disiloxane and binder may be mixed prior to spraying, or by contacting the sprayed liquid droplets of both materials, for example by spraying the materials via separate nozzles. Solidification of the droplets which then contain both materials in liquid form may be encouraged, for example by use of a cool air counter stream, thus reducing more quickly the temperature of the droplets. Alternatively solidification may be encouraged by the use of air counter current to aid evaporation of any solvent present. Other ways of encouraging solidification will be clear to the person skilled in the art. Total solidification does preferably not take place prior to the mixture being deposited onto carrier. The finely divided particulate wetting and hydrophobing additive is then collected at the bottom of the tower.

In a still further method the disiloxane and binder are sprayed simultaneously into a drum mixer containing the carrier. On spraying small liquid droplets are formed containing disiloxane and binder. The droplets partially cool down on contact with the carrier particles. After mixing is complete the partially cooled particles are transferred to a fluidised bed where cooling is completed with ambient air. The finely divided particles of particulate wetting and hydrophobing additive are then collected directly from the fluidised bed. Optionally the particles may be further screened by sieving to produce particles of hydrophobing additive substantially free of any undersized or oversized material. A typical apparatus which is useful is the Eirich® pan granulator, the Schugi® mixer, the Paxeson-Kelly® twin-core blender, the Lödige® ploughshare mixer or one of the numerous types of fluidised bed apparatuses, e.g. Aeromatic® fluidised bed granulator.

In an alternative granulation process disiloxane is emulsified or at least dispersed in the aqueous solution or emulsion of binder. The resultant emulsion is deposited in a liquid form, for example by spraying, onto carrier e.g. in a fluid bed, thus causing the disiloxane and binder in admixture to solidify, through the evaporation of water, onto the carrier to form a free flowing powder.

Subsequent to granulation, irrespective of the method used, the particulate wetting and hydrophobing additive is then collected from the fluidised bed.

Typical apparatus which may be used for granulation includes the Eirich® pan granulator, the Schugi® mixer, the Paxeson-Kelly® twin-core blender, the Lodige® ploughshare mixer, the Lodige® Continuous Ring Layer Mixer or one of the numerous types of fluidised bed apparatuses, e.g. Aeromatic® fluidised bed granulator. Optionally the particles may be further screened by sieving to produce particles of hydrophobing additive substantially free of any undersized or oversized material.

The above particulate wetting and hydrophobing additive may include additional ingredients which are in a suitable form to be additionally adsorbed onto a powder or granulated into granules as hereinbefore described. Additional ingredients may include, for example, trisiloxane based wetting agents, viscosity modifiers, pigments, colorants, preservatives, gelling agents, pH modifiers, buffers, accelerators, retarders, air entrainers and fillers, e.g. silica and titanium dioxide. It is however preferred that such additional optional ingredients do not comprise more than 5% by weight of the total weight of the additive.

Any suitable trisiloxane based wetting agent may be utilised as an additive, for example polyoxyalkylene trisiloxanes, which have the following general formula:

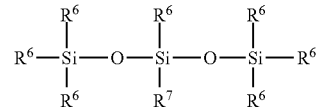

where each $R^6$ is independently a hydrocarbon having 1 to 4 carbon atoms and $R^7$ is

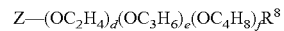

in which Z and $R^8$ are as hereinbefore described and d is from 1 to 30 and e and f are independently from 0 to 10. A commercial example of such trisiloxanes is Sylgard B 309 from Dow Corning Corporation.

Typically the particulate wetting and hydrophobing additive is introduced into a dry-mix in a dry particulate form as a powder or in a granular form. The particulate wetting and hydrophobing additive may then be mixed in a cementitious powder material and would form a stable dry composition which may easily be stored or transported in that form.

The amount of particulate wetting and hydrophobing additive which is present in the cementitious material according to the invention is such that from 0.01 to 5% by weight of carrier is present in the total cementitious composition i.e. about 0.02 to 10% by weight of the granule as typically the overall weight of a typical granule is about 50% carrier and about 50% binder/disiloxane. Alternatively the amount of carrier component is from 0.05 to 5% weight, or in a further alternative from 0.05 to 1.0% by weight of the cement present. It is preferred that the maximum amount of disiloxane present in the cementitious material is about 2% by weight based on the weight of the cement which is present, most preferably from 0.5 to 1% by weight based on the weight of the cementitious material.

Typically the cementitious material will additionally comprise one or more hydrophobing materials such suitable silicone-based hydrophing materials and/or silane-based hydrophobing materials as well as, for example, palmitic, stearic or oleic acid salt(s) of ammonia, alkali metals, alkali-earth metals or transition metals or a mixture thereof may be selected from palmitic, stearic or oleic acid salts of zinc, iron, copper, barium, calcium, magnesium, lithium, sodium, potassium, aluminium and ammonia and is preferably selected from ammonium stearate, sodium stearate, lithium stearate, potassium stearate, magnesium stearate, calcium stearate, barium stearate, zinc stearate, aluminium tri stearate, aluminium-di-stearate, aluminium mono stearate, copper stearate, sodium oleate and potassium oleate, calcium oleate and zinc oleate. Most preferably the salt is zinc stearate or calcium stearate. Least preferred of the metal stearates are the alkali metal stearates as residual alkali metal cations in set cementitious material are known to cause efflorescence therein.

It is to be understood that the meaning of stearate should be construed to be anything from a 100% stearate salt where all anions are stearate anions to a commercially available stearate which tends to be a mixture, substantially of the salts of stearic and palmitic acids.

The amount of such hydrophobing materials present in a cementitious material as hereinbefore described is determined by the need for hydrophobicity for the end product to be made once water is introduced into the cementitious dry-mix. Typically the cementitious material will also include from 0.01 to 5% by weight of the hydrophobing materials of the cementitious material. Alternatively the amount of hydrophobing materials component is from 0.05 to 5% weight, or in a further alternative from 0.05 to 1.0% by weight of the cementitious composition present.

The cementitious material according to the second aspect of the invention may also comprise further optional ingredients. These further optional ingredients may include sand, filler and other materials traditionally found in cementitious materials, e.g. lime, aggregate, accelerators, air entrainers, pigments, retarders and pozzolanic materials. Preferably the cementitious material is cement, concrete, mortar or grout or the like.

When water is introduced into the dry mix the disiloxanes as hereinbefore described function initially as wetting agents but gradually degrade because of the basic nature of the environment of the cementitious material via a hydrolysis reaction initiated when water is introduced into the cementitious composition comprising the granulated particles as herein described. However in accordance with the present disclosure at least some of the resulting degradation products, are hydrophobic and therefore having a positive effect in the hydrophobing of the cementitious mixture subsequent to their degradation after functioning as part of the wetting agent.

In each case the hydrophobic degradation product depicted above improves the hydrophobic nature of the resulting concrete or like material by its mere presence after the degradation of the disiloxane present in the granulated additives in the cementitious material prior to the addition of water.

In a third aspect of the invention, there is provided a process of imparting to cementitious material a hydrophobing character by mixing into the cementitious material a hydrophobing additive in accordance with the first aspect of the present invention. Mixing may be done by mechanical means or any other appropriate method known in the art.

Uses for the Compositions of the Present Invention:

In addition to their use in dry mixes the granules of the present invention may be utilised in coatings, particularly hydrophobing coatings which are stored as dry mixes to which a solvent e.g. water is added prior to use.

Typically coatings formulations will require a wetting agent or surfactant for the purpose of emulsification, compatibilization of components, levelling, flow and reduction of surface defects. Additionally, these additives may provide improvements in the cured or dry film, such as improved abrasion resistance, anti-blocking, hydrophilic, and hydrophobic properties. Coatings formulations may exist as solvent-borne coatings, water-borne coatings and powder coatings.

The coatings components may be employed as: Architecture coatings; OEM product coatings such as automotive coatings and coil coatings; Special Purpose coatings such as industrial maintenance coatings and marine coatings. Other possible applications include for Household care, applications, in pulp and paper applications and use in textiles.

EXAMPLES

There now follows a number of examples which illustrate the invention in detail but are not to be construed to limit the scope thereof. All parts and percentages in the examples are on a weight basis and all measurements were obtained at room temperature (typically 20° C.+/−1-2° C.) unless indicated to the contrary.

A series of samples were prepared as described below:
Powdered organomodified siloxane 1
19.6 g diphenyl disiloxane having the following formula:

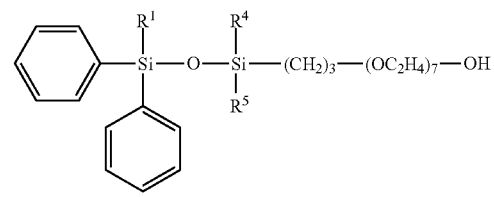

(Where $R^1$, $R^4$ and $R^5$ are each methyl groups) was mixed in 60.3 g of an aqueous polyvinyl alcohol solution containing 20% solid content for 3 minutes with a rotor/stator mixer (Ultraturrax) to form an emulsion. The polyvinyl alcohol used was Mowiol® 4/88 from Kuraray which has a viscosity of 3.5 mPa·s at 4% solid content using a Höppler viscometer and 88% hydrolysis (88% of polyvinyl acetate groups hydrolysed to alcohol groups during preparation). 39.8 g of the resultant creamy emulsion was poured over 100.1 g of zeolite (DOUCIL® 4 A from INEOS) with a particle size of between 2 to 5 μm and the whole was placed in a domestic kitchen food mixer under agitation at maximum mixer speed for a total mixing period of 15-30 seconds resulting in a granulated powder. The granulated powder was dried in a Strea-1cc fluidised bed from Niro for 15 minutes and sieved to remove any particles larger than 0.5 mm diameter. The resulting granulated powder is henceforth referred to as powdered organomodified siloxane 1.
Powdered Organomodified Siloxane 2
20 g of a disiloxane of the formula

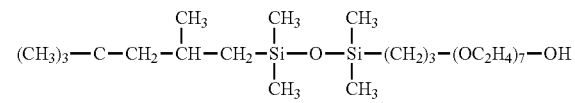

was mixed in 60 g of an aqueous polyvinyl alcohol solution 20% solid (Mowiol® 4/88 from Kuraray) for 3 minutes with a rotor/stator mixer (Ultraturrax) to form an emulsion. 39.8 g of the resultant creamy emulsion was poured over 101 g of zeolite (DOUCIL 4A from INEOS), having a particle size of about 2 to 5 µm in domestic kitchen food mixer under agitation at maximum mixer speed within a period of 15-30 seconds resulting in a granulated powder. The granulated powder was dried in a Strea-1cc fluidised bed from Niro for 15 minutes and sieved to remove any particles larger than 0.5 mm diameter. The resulting granulated powder is henceforth referred to as powdered organomodified siloxane 2.

Powdered Organomodified Siloxane 3

19.9 g of an n-octyldisiloxane of the following formula: —

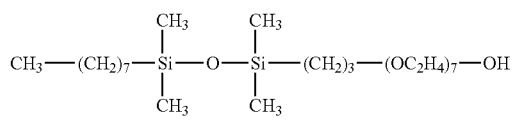

was mixed in 60 g of an aqueous polyvinyl alcohol solution 20% solid (Mowiol® 4/88 from Kuraray) for 3 minutes with a rotor/stator mixer (Ultraturrax) to form an emulsion. 39.8 g of the resultant creamy emulsion was poured over 101 g of zeolite (DOUCIL 4A from INEOS), having a particle size of about 2 to 5 µm in a domestic kitchen food mixer under agitation at maximum mixer speed for a period of 15-30 seconds resulting in a granulated powder. The granulated powder was dried in a Strea-1cc fluidised bed from Niro for 15 minutes and sieved to remove any particles larger than 0.5 mm diameter. The resulting granulated powder is henceforth referred to as powdered organomodified siloxane 3.

Comparative Powdered Organomodified Siloxane 1

19.9 g 1,1,1,3,5,5,5-Heptamethyl-3-(propyl(poly(EO))acetate)trisiloxane was mixed in 60.2 g of an aqueous polyvinyl alcohol solution 20% solid (Mowiol® 4/88 from Kuraray) for 3 minutes with a rotor/stator mixer (Ultraturrax). 40.3 g of the resultant creamy emulsion was poured over 104.3 g of zeolite (DOUCIL 4A from INEOS), having a particle size of about 2 to 5 µm in a domestic kitchen food mixer under agitation at maximum mixer speed within a period of 15-30 seconds resulting in a granulated powder. The granulated powder was dried in a Strea-1 cc fluidised bed from Niro for 15 minutes and sieved to remove any particles larger than 0.5 mm diameter. The resulting granulated powder is henceforth referred to as Comparative powdered organomodified siloxane 1.

Comparative Powdered Organomodified Siloxane 2

19.6 g of Trimethylsiloxy-terminated Dimethyl, Methyl (propyl(poly(EO)(PO)) hydroxy) Siloxane having a viscosity of 41 cSt at 25° C. using the glass capillary method (ASTM D445-11a Standard test Method for Kinematic Viscosity of Transparent and opaque Liquids), was mixed in 60.2 g of an aqueous polyvinyl alcohol solution 20% solid (Mowiol® 4/88 from Kuraray) for 3 minutes with a rotor/stator mixer (Ultraturrax) to form an emulsion. 41.3 g of the resultant creamy emulsion was poured over 100.6 g of zeolite (DOUCIL 4A from INEOS), having a particle size of about 2 to 5 µm in domestic kitchen food mixer under agitation at maximum mixer speed within a period of 15-30 seconds resulting in a granulated powder. The granulated powder was dried in a Strea-1cc fluidised bed from Niro for 15 minutes and sieved to remove any particles larger than 0.5 mm diameter. The resulting granulated powder is henceforth referred to as Comparative powdered organomodified siloxane 2.

The Dynamic Wetting of standard compositions containing an amount of each respective powdered organomodified siloxane 1, 2 and 3 and comparative powdered organomodified siloxane 1 were prepared by identical processes and are referred to as Examples 1, 2, 3 and Comparative 1 in Table 1 below, which compares their results to a reference material containing no wetting agent. Each siloxane was prepared for the test by the method described below (Preparation of Example 1), the only differences being in each case the replacement of sample 1 with each respective alternative powdered organomodified siloxanes or Comparative powdered organomodified siloxane 1.

Preparation of Example 1

0.52 g of powdered organomodified polysiloxane 1 was introduced into a Krups mixer (KA 940 model), having a 5 liters stainless steel 2 handle mixing bowl and a 1.5 Liters stainless steel blender, together with:
  390 g of dried sand which has a granulometry of up to a maximum of 2 mm; 130 g of cement (CEM II 32.5 N); and
  1.3 g of zinc stearate. The powders are then blended homogeneously for 60 seconds at level 2 speed.

The resulting Examples and Comparatives were compared using the following Dynamic wetting test method:

After having homogenized the powders, 65 g of water was introduced into the bowl at level 2 speed. The time needed by the water to totally wet the dry mix is timed and is henceforth referred to as the dynamic wetting time. The dynamic wetting time is compared with the reference dynamic wetting time of a Reference dry-mix that contains only the quantities of sand, cement and zinc stearate (dynamic wetting time that is lower than the reference dynamic wetting time induces an excellent wettability and thus a good ease of use). The results are obtained from an average of three measurements.

TABLE 1

|  | Dynamic wetting time (s) |
|---|---|
| Example 1 | 9 |
| Example 2 | 9 |
| Example 3 | 10 |
| Reference | 28 |
| Comparative 1 | 14 |

These results show that examples 1, 2 and 3 are better than the reference and comparative examples because the time needed by the water to wet the dry-mix is significantly shorter.

Static Wetting Test for standard compositions containing an amount of each respective powdered organomodified siloxane and comparative powdered organomodified siloxane prepared above were prepared in an identical process as follows using the siloxanes indicated in Table 2a TABLE 2a

| Example 4 | Powdered organomodified siloxane 1 |
| Example 5 | Powdered organomodified siloxane 2 |
| Example 6 | Powdered organomodified siloxane 3 |
| Reference | None |

TABLE 2a-continued

| | |
|---|---|
| Comparative 2 | Comparative powdered organomodified siloxane 1. |
| Comparative 3 | Comparative powdered organomodified siloxane 2. |

Example 4

A dry-mix composed of 54 g of dried sand which has a granulometry between 0 and 2 mm and 18 g of cement (CEM II 32.5N) is prepared within a closed pot. Then 0.18 g of zinc stearate and 0.072 g of powdered organomodified siloxane 1 was introduced into the closed pot. The dry-mix was then blended for 60 seconds.

The preparation of Examples 5 and 6 and Comparatives 2 and 3 was analogous to the preparation of Example 4 with only the respective powdered organomodified siloxane replacing powdered organomodified siloxane 1. In the case of the Reference the only difference is that no siloxane is added.

Reference:

A dry-mix composed of 54 g of dried sand which has a granulometry between 0 and 2 mm and 18 g of cement (CEM II 32.5N) is prepared within a closed pot. Then 0.18 g of zinc stearate is introduced into the closed pot. The dry-mix is then blended for 60 seconds.

The static wetting test was carried out as follows: Equal amounts by weight of each example and comparative was placed on separate plates. Five water drops are softly dropped onto the respective dry-mixes. The time for the water drops to totally wet the dry-mix is measured using a Hanhart sprint chronometer and is henceforth referred as static wetting time.

The static wetting time is compared with the static wetting time of the Reference dry-mix containing only quantities of sand, cement and zinc stearate (static wetting time that is lower than the reference static wetting time induces an excellent wettability and thus a good ease of use). The results are obtained from an average of five measurements and are provided in Table 2b below in which SWT is Static Wetting Time.

TABLE 2b

| | SWT $1^{st}$ Drop(s) | SWT $2^{nd}$ Drop(s) | SWT $3^{rd}$ Drop(s) | SWT $4^{th}$ Drop(s) | SWT $5^{th}$ Drop(s) | Average(s) |
|---|---|---|---|---|---|---|
| Example 4 | 300 | 300 | 300 | 480 | 480 | 300 |
| Example 5 | 180 | 360 | 360 | 360 | 480 | 300 |
| Example 6 | 480 | 480 | 480 | 540 | 540 | 480 |
| Reference | 480 | 480 | 540 | 540 | 600 | 528 |
| Comp 2 | 300 | 420 | 420 | 600 | 600 | 380 |
| Comp 3 | 240 | 300 | 300 | 300 | 720 | 280 |

Compared to the Reference in which only Zn stearate was utilised in the dry-mix, all other examples provide a better ease of use because the average drop entry time decreased from more than 500 seconds for the reference dry-mix to less than 300 seconds for modified dry-mixes.

Protocol of Drop Entry Time and Beading Test

Examples and comparatives were prepared to determine the drop entry time and beading for standard compositions containing an amount of each respective powdered organomodified siloxane and comparative powdered organomodified siloxane prepared above were prepared in an identical process as follows using the siloxanes indicated in Table 3a below:

TABLE 3a

| | |
|---|---|
| Example 7 | Powdered organomodified siloxane 1 |
| Example 8a & 8b | Powdered organomodified siloxane 2 |
| Example 9a, 9b & 9c | Powdered organomodified siloxane 3 |
| Reference 2a, 2b & 2c | None |
| Reference 3a and 3b | None |
| Comparative 4a and 4b | Comparative powdered organomodified siloxane 1 |
| Comparative 5a and 5b | Comparative powdered organomodified siloxane 2 |

Example 7

108 g of dried sand of granulometry between 0-2 mm, 36 g of cement (CEM II 32.5N), 0.36 g of zinc stearate and 0.144 g of powdered organomodified siloxane 1 are dry blended for one minute. Then 19 g of mixing water is added. The resulting slurry is then poured into a pre-prepared test piece mould measuring 60×60×20 mm. The mould is place on a vibrating table for 3 minutes and then placed in a closed container at 100% Relative humidity. The test mortar block is de-moulded after 24 hours and allowed to cure in a chamber for a period of 7 days at a temperature of 25° C. and at 100% relative humidity. After 7 days of cure, the mortar block is dried for 24 hours in an oven at 50° C.

The preparation of Examples 8, 9 and comparatives 4 and 5 were prepared in an analogous manner to using Powdered organomodified siloxane 1 in the preparation of Example 7 with the only difference being the replacement of the respective siloxane.

Reference 2a, 2b and 2c 108 g of dried sand of granulometry between 0-2 mm, 36 g of cement (CEM II 32.5N), 0.36 g of zinc stearate are dry blended for one minute. Then 19 g of mixing water is added. The resulting slurry is then poured into a pre-prepared test piece mould measuring 60×60×20 mm. The mould is placed on a vibrating table for 3 minutes and then placed in a closed container at 100% Relative humidity. The test mortar block is de-moulded after 24 hours and allowed to cure in a chamber for a period of 7 days at a temperature of 25° C. and at 100% relative humidity. After 7 days of cure, the mortar block is dried for 24 hours in an oven at 50° C.

Reference 3a 108 g of dried sand of granulometry between 0-2 mm, 36 g of cement (CEM II 32.5N), 0.36 g of zinc stearate are dry blend for one minute. Then 19 g of mixing water is added. The resulting slurry is then poured into a pre-prepared test piece mould measuring 60×60×20 mm. The mould is place on a vibrating table for 3 minutes and then placed in a closed container at 100% Relative humidity. The test mortar block is de-moulded after 24 hours and allowed to cure in a chamber for a period of 7 days at a temperature of 25° C. and at 100% relative humidity. After 7 days of cure, the mortar block is dried for 24 hours in an oven at 50° C.

Reference 3b 108 g of dried sand of granulometry between 0-2 mm, 36 g of cement (CEM II 32.5N), 0.504 g of zinc stearate are dry blend for one minute. Then 19 g of mixing water is added. The resulting slurry is then poured into a pre-prepared test piece mould measuring 60×60×20 mm. The mould is placed on a vibrating table for 3 minutes and then placed in a closed container at 100% Relative humidity. The test mortar block is de-moulded after 24 hours and allowed to cure in a chamber for a period of 7 days at a temperature of 25° C. and at 100% relative humidity. After 7 days of cure, the mortar block is dried for 24 hours in an oven at 50° C.

Protocol of Drop Entry Time and Beading Test

A water droplet is gently deposited on the modified mortar surface with a pipette. The time needed to have the water droplet completely absorbed by the mortar surface is recorded (referred in this document as the drop entry time) and the average of 5 independent measurements is calculated.

Beading effect is a qualitative comparison between the spreading and the shape of the water droplets deposited on the surface of the mortar block and is measured using a ranking scheme: from 0 (for a droplet that totally wets the surface of the mortar block, i.e. resulting in a flat droplet), to 5 (for a droplet that forms a perfect spherical droplet on the surface of the mortar block.

TABLE 3b

| | DET drop 1 (min) | DET drop 2 (min) | DET drop 3 (min) | DET drop 4 (min) | DET drop 5 (min) | Average (min) | Beading Effect |
|---|---|---|---|---|---|---|---|
| Ex 7 | 14 | 29 | 35 | 40 | 60 | 35.6 | 4 |
| Ex 8a | 18 | 26 | 27 | 30 | 43 | 28.8 | 3 |
| Ex 8b | 11 | 32 | 42 | 45 | 60 | 38 | 3 |
| Ex 9a | 7 | 9 | 11 | 11 | 18 | 11.2 | 4 |
| Ex 9b | 13 | 24 | 27 | 40 | 47 | 30.2 | 4 |
| Ex 9c | 4 | 24 | 29 | 35 | 60 | 30.4 | 4 |
| Ref 2a | 1 | 1 | 1 | 2 | 2 | 1.4 | 0 |
| Ref 2b | 1 | 1 | 1 | 3 | 3 | 1.8 | 0 |
| Ref 2c | 1 | 1 | 2 | 2 | 3 | 1.8 | 0 |
| Ref 3a | 2 | 4 | 5 | 7 | 12 | 6 | 1 |
| Ref 3b | 2 | 3 | 8 | 13 | 15 | 8.2 | 1 |
| Comp 4a | 6 | 17 | 22 | 22 | 30 | 19.4 | 3 |
| Comp 4b | 3 | 6 | 10 | 16 | 16 | 10.2 | 3 |
| Comp 5a | 6 | 8 | 14 | 17 | 20 | 13 | 2 |
| Comp 5b | 5 | 10 | 16 | 16 | 17 | 12.8 | 2 |

The results show that reference examples 2a, 2b and 2c give very bad beading effect with a value of zero and a Drop Entry Time (DET) between 1 and 2 minutes, meaning that there is no hydrophobic treatment of the mortar block. Results regarding Reference examples 3a and 3b that are modified with stearate indicate a slight hydrophobic nature as the beading effect value is one and their DET is between 6 and 8 minutes. Comparative examples 4a, 4b, 5a and 5b that are modified with stearate and standard silicone superwetter also exhibit a higher hydrophobic nature than the References as the silicone surfactants help the stearate to be more homogeneously distributed over the mortar block. However, Examples 7, 8a, 8b, 9a, 9b and 9c exhibit on average an even better hydrophobic nature (i.e. a significantly better application onto the mortar block) as their beading effect value was between 3 and 4 and their DET was on average greater than 25 minutes. Examples show that new disiloxanes provide to mortar block hydrophilic effect in the first place and after degradation surprisingly provide high level of hydrophobicity to mortar block.

The invention claimed is:

1. A particulate wetting and hydrophobing additive comprising components a) and b), where:
component a) is a disiloxane having structure

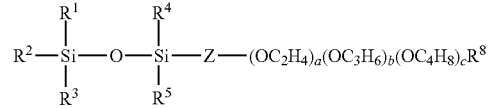

where $R^2$ is selected from a branched or linear hydrocarbon group of 2 to 10 carbons, a substituted branched or substituted linear hydrocarbon group of 2 to 10 carbons, an aryl group, a substituted aryl group and an optionally substituted alkyl hydrocarbon group of 4 to 9 carbons containing aryl substituents of 6 to 20 carbons; $R^1$, $R^3$, $R^4$ and $R^5$ are each independently selected from the monovalent hydrocarbon groups of 1 to 4 carbons, substituted monovalent hydrocarbon groups of 1 to 4 carbons, aryl, and a hydrocarbon group of 6 to 20 carbons containing an aryl group;
Z is a linear or branched divalent hydrocarbon radical of 1 to 10 carbons and $R^8$ is selected from OH, H, monovalent hydrocarbon groups of 1 to 6 carbons and acetyl, each of the subscripts a, b and c are zero or positive provided that a+b+c≥1; and component b) is a carrier.

2. A particulate wetting and hydrophobing additive in accordance with claim 1 wherein $R^1$, $R^3$, $R^4$ and $R^5$ are each independently selected from monovalent hydrocarbon groups of 1 to 4 carbons, monovalent hydrocarbon groups of 1 to 4 carbons and at least one C-F bond, aryl, an optionally substituted hydrocarbon group of 6 to 20 carbons containing an aryl group;
$R^2$ is selected from a branched or linear hydrocarbon group of 2 to 10 carbons, an optionally substituted aryl group, and an alkyl hydrocarbon chain of 4 to 9 carbons having one or more aryl substituents of 6 to 20 carbons or a branched or linear hydrocarbon group of 2 to 6 carbons when $R^1$ and $R^3$ are independently an aryl group, or a hydrocarbon group of 6 to 20 carbons containing an aryl group;
Z is a linear or branched divalent hydrocarbon radical of 2 to 10 carbons and $R^8$ is selected from OH, H, monovalent hydrocarbon radicals of from 1 to 6 carbons and acetyl and each of the subscripts a, b and c are zero or positive provided that a+b+c≥1.

3. A particulate wetting and hydrophobing additive in accordance with claim 2 characterised in that in the disiloxane subscript a>1, subscript b≥0 and subscript c=0.

4. A particulate wetting and hydrophobing additive in accordance with claim 2 characterised in that in the disiloxane subscript a is ≥3 and b and c are both zero.

5. A particulate wetting and hydrophobing additive in accordance with claim 1 characterised in that in the disiloxane $R^1$ and/or $R^3$ is/are selected from the group of optionally substituted monovalent hydrocarbon radicals having 1 to 4 carbons, an optionally substituted aryl group, and a hydrocarbon group of 4 to 9 carbons containing an aryl group of 6 to 20 carbons and $R^4$ and $R^5$ are each independently selected from monovalent hydrocarbon radicals having 1 to 4 carbons.

6. A particulate wetting and hydrophobing additive in accordance with claim 1 characterised in that in the disiloxane $R^1$ and/or $R^3$ is/are optionally substituted aryl groups and R⁴ and R⁵ are each independently selected from monovalent hydrocarbon radicals having 1 to 4 carbons.

7. A particulate wetting and hydrophobing additive in accordance with claim 1 characterised in that in the disiloxane R² is selected from a linear or branched hydrocarbon group of 8 to 12 carbons or an optionally substituted aryl group.

8. A particulate wetting and hydrophobing additive in accordance with claim 1 characterised in that the carrier is selected from one or more of gypsum, calcium sulphate formed in flue gas desulphurisation, magnesium sulphate or barium sulphate starch, native starch, methyl cellulose, carboxy methyl cellulose, sand, silica, alumino silicates, clay materials, zeolites, calcium carbonates, polystyrene beads and/or polyacrylate beads.

9. A particulate wetting and hydrophobing additive in accordance with claim 1 characterised in that the additive comprises granules which additionally comprise a water-soluble or water-dispersible binder material selected from one or more of polyvinyl alcohol, methyl cellulose, carboxy methyl cellulose, ethoxylated fatty alcohols and mixtures thereof with fatty acids and fatty acid esters.

10. A particulate wetting and hydrophobing additive in accordance with claim 1 characterised in that granules comprise based on a total weight of 100%, 5 to 80% by weight of carrier based on the total weight of the granular composition from 3 to 45% by weight of binder based on the total weight of the granular composition and from 5 to 90% disiloxane based on the total weight of the granular composition, based on the proviso that the total composition always comprises 100% by weight.

11. A particulate wetting and hydrophobing additive in accordance with claim 1 characterised in that the composition further comprises a trisiloxane have the following general formula:

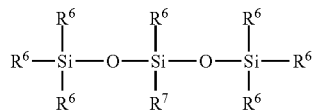

where each R⁶ is independently a hydrocarbon having 1 to 4 carbons and R⁷ is

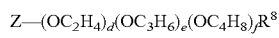

in which Z is a linear or branched divalent hydrocarbon radical of from 1 to 10 carbons and R⁸ is selected from OH, H, monovalent hydrocarbon radicals of from 1 to 6 carbons and acetyl, d is from 1 to 30 and e and f are independently from 0 to 10.

12. A particulate wetting and hydrophobing additive in accordance with claim 1 characterised in that the disiloxane is selected from one or more of the siloxanes in accordance with Formulas 1, 3, 5 and 7:

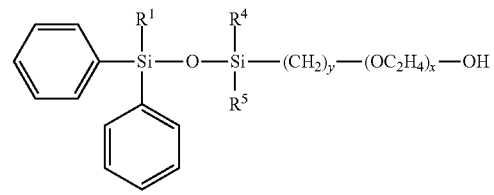

where y is an integer of from 2 to 7, and x is an integer of from 5 to 10;

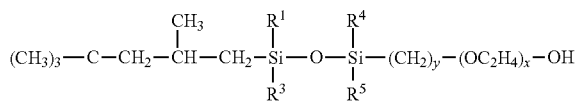

where y is an integer of from 2 to 7, and x is an integer of from 5 to 10;

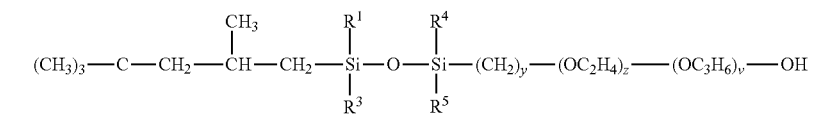

where y is an integer of from 2 to 7, z is an integer of from 5 to 15,
and v is an integer of from 2 to 10;

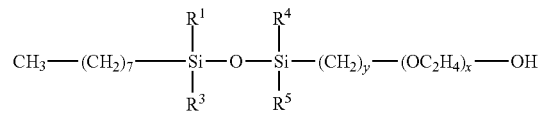

where y is an integer of from 2 to 7,
and x is an integer of from 5 to 10.

13. A cementitious material dry-mix comprising dry cement and a particulate wetting and hydrophobing additive as defined in claim 1 in an amount sufficient to give from 0.01 to 2% by weight of the disiloxane.

14. A cementitious material dry-mix in accordance with claim 13 additionally comprising one or more hydrophobing materials selected from palmitic acid salt(s), stearic acid salt(s) or oleic acid salt(s) of one or more of the following: zinc, iron, copper, barium, calcium, magnesium, lithium, sodium, potassium, aluminium and ammonia, silane or siloxane hydrophobic powder.

15. A process for imparting a hydrophobic character to cementitious material, comprising mixing into the cementitious material a particulate wetting and hydrophobing additive as defined in claim 1 and subsequently adding water.

* * * * *